United States Patent
Kojima et al.

(10) Patent No.: US 7,450,154 B2
(45) Date of Patent: Nov. 11, 2008

(54) DIGITAL CAMERA PERFORMING PIXEL SHIFT BASED ON ELECTRONIC ZOOM

(75) Inventors: Kazuhiko Kojima, Kawachinagano (JP); Hideki Morinaga, Hachioji (JP); Tougo Teramoto, Wakayama (JP); Hideaki Nakanishi, Mishima-gun (JP); Hiroaki Hasegawa, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 679 days.

(21) Appl. No.: 11/077,621

(22) Filed: Mar. 11, 2005

(65) Prior Publication Data

US 2006/0087561 A1    Apr. 27, 2006

(30) Foreign Application Priority Data

Oct. 26, 2004    (JP) ............................. 2004-310887

(51) Int. Cl.
G03B 17/00 (2006.01)
H04N 5/228 (2006.01)
H04N 5/262 (2006.01)
H04N 5/225 (2006.01)

(52) U.S. Cl. .............................. 348/208.12; 348/208.6; 348/208.5; 348/240.2; 348/240.99; 348/218.1; 396/52

(58) Field of Classification Search ............ 348/208.99, 348/208.4, 208.5, 208.7, 208.12, 208.13, 348/240.2, 240.99, 218.1, 208.6; 396/52–55
See application file for complete search history.

(56) References Cited

U.S. PATENT DOCUMENTS

| 5,402,171 | A | * | 3/1995 | Tagami et al. ............. 348/219.1 |
| 5,889,553 | A | * | 3/1999 | Kino et al. ............... 348/218.1 |
| 5,969,757 | A | * | 10/1999 | Okada et al. ............. 348/219.1 |
| 6,424,372 | B1 | * | 7/2002 | Kaneda et al. .......... 348/207.99 |
| 6,473,120 | B2 | * | 10/2002 | Hirasawa et al. ......... 348/208.1 |
| 6,573,930 | B2 | * | 6/2003 | Kyuma et al. ............ 348/208.5 |
| 6,678,000 | B1 | * | 1/2004 | Sakata ........................ 348/369 |
| 6,781,622 | B1 | * | 8/2004 | Sato et al. ................ 348/208.4 |
| 6,930,708 | B1 | * | 8/2005 | Sato et al. .............. 348/208.99 |
| 7,224,893 | B2 | * | 5/2007 | Uenaka ........................ 396/55 |
| 7,269,344 | B2 | * | 9/2007 | Nishioka et al. .............. 396/60 |

(Continued)

FOREIGN PATENT DOCUMENTS

JP    6-339083 A    12/1994

(Continued)

Primary Examiner—David Ometz
Assistant Examiner—Richard M Bemben
(74) Attorney, Agent, or Firm—Sidley Austin LLP

(57) ABSTRACT

In an electronically zoomable digital camera having a hand shake correction mechanism, when electronic zoom operates, pixel shift is carried out in such manner of capturing a reference image and then capturing a shifted image after moving an image capturing element from the reference image by a prescribed amount of shift by means of the hand shake correction mechanism and thereafter interpolating pixels of the shifted image between pixels of the reference image. The amount of shift is changed according to a magnification of the electronic zoom. The hand shake correction mechanism has a continuous mode in which the movement is effected by a continuous amount and a fixed amount mode in which movement is effected by only a fixed amount and is driven in the fixed amount mode when the pixel shift is carried out.

7 Claims, 11 Drawing Sheets

U.S. PATENT DOCUMENTS

| | | | |
|---|---|---|---|
| 7,286,164 B2 * | 10/2007 | Shinohara et al. | 348/219.1 |
| 2003/0076421 A1 * | 4/2003 | Dutta | 348/208.11 |
| 2005/0157287 A1 * | 7/2005 | Seo | 355/72 |
| 2005/0185057 A1 * | 8/2005 | Seo | 348/208.4 |
| 2005/0204640 A1 * | 9/2005 | Seo | 52/7 |
| 2006/0017815 A1 * | 1/2006 | Stavely et al. | 348/208.7 |
| 2006/0085658 A1 * | 4/2006 | Lee et al. | 348/208.7 |

FOREIGN PATENT DOCUMENTS

| | | |
|---|---|---|
| JP | 7-287268 A | 10/1995 |
| JP | 2001-223932 A | 8/2001 |

* cited by examiner

DURING
HAND SHAKE
CORRECTION

DURING
PIXEL SHIFT (c)

(d)

DIGITAL CAMERA PERFORMING PIXEL SHIFT BASED ON ELECTRONIC ZOOM

RELATED APPLICATION

This application is based on Japanese Patent Application No. 2004-310887, the content of which is incorporated herein by reference.

BACKGROUND OF THE INVENTION

The present invention relates to a digital camera.

Many digital cameras, in which an image formed on an image capturing element is converted into electronic data and recorded, are provided with "electronic zoom" for obtaining a pseudo enlarged image whose angle of view of the image picked up by cutting a partial image out of the image formed on the image capturing element and recording the partial image is reduced. However, there is a problem that the pixels of the image are reduced in number to disadvantageously lead to a degraded resolution when the electronic zoom is used.

Moreover, as a means for obtaining an image of high resolution higher than the resolution of the image capturing element, "pixel shift" for synthesizing a high-resolution image by continuously capturing a plurality of images of different image capturing ranges by an equally divided amount of pixel pitch and interpolating the pixels of another image between the pixels of one image is well known.

Moreover, "hand shake correction" for obtaining a clear image by providing a drive mechanism for moving the image capturing element or an optical member and a shake amount detection section for detecting the amount of shake of the digital camera itself in order to solve the problem of hand shake that the captured image becomes indistinct due to the shake of the digital camera itself and canceling the shake of the digital camera with the movement of the image capturing element or the optical member is also well known.

Furthermore, a technique for providing a digital camera with a drive mechanism for moving the image capturing element or an optical member and carrying out both the "hand shake correction" and the "pixel shift" by means of the drive mechanism is disclosed in Japanese Patent Laid-Open Publications No. 2001-223932 or H07-287268. However, no consideration for the degradation in resolution due to the electronic zoom is provided in these documents.

SUMMARY OF THE INVENTION

Accordingly, the object of the present invention is to provide a digital camera capable of obtaining a high-resolution image during the electronic zoom.

In order to achieve the object, in a first aspect of the present invention, there is provided an electronically zoomable digital camera having a hand shake correction mechanism for moving an optical member or an image capturing element to correct hand shake, wherein, when electronic zoom operates, pixel shift is carried out in such manner of capturing a reference image that serves as a reference and then capturing a shifted image after moving the optical member or the image capturing element from the reference image by a prescribed amount of shift by means of the hand shake correction mechanism and thereafter interpolating pixels of the shifted image between pixels of the reference image, the amount of shift is changed according to a magnification of the electronic zoom, and the hand shake correction mechanism has a continuous mode in which the movement is effected by a continuous amount and a fixed amount mode in which movement is effected by only a fixed amount and is driven in the fixed amount mode when the pixel shift is carried out.

According to the construction, the pixel shift is carried out during the electronic zoom in the digital camera, and therefore, a high-resolution image can be obtained. Moreover, the hand shake correction and the pixel shift are carried out by the identical hand shake correction mechanism, and therefore, an inexpensive compact digital camera can be provided.

Moreover, by reducing the amount of shift as the electronic zoom magnification increases and interpolating many pixels of the shifted images between the pixels of the reference image, the number of interpolation pixels can be increased. Therefore, more interpolations become possible as the number of pixels of the reference image is reduced by the electronic zoom, and therefore, the resolution is not degraded even if the electronic zoom is carried out.

Furthermore, followability and a wide operation range are secured by operating the camera in the continuous mode when the hand shake correction is carried out, and satisfactory hand shake correction can be achieved. Moreover, a high positioning accuracy is achieved by driving the camera in the fixed amount mode when the pixel shift is carried out, and therefore, a shifted image suitable for interpolating the reference image can be obtained.

In the digital camera of the first aspect of the present invention, the hand shake correction mechanism may be driven by at least one piezoelectric element. It is acceptable to apply the square wave voltage to the piezoelectric element in the continuous mode and apply the triangular wave voltage of a wavelength longer than that of the square wave voltage to the piezoelectric element only once per movement in the fixed amount mode.

According to the construction, it is possible to quickly move the image capturing element by the square wave pulses of a short wavelength in the continuous mode and reliably move the image capturing element by the triangular wave pulse in the fixed amount mode by the prescribed amount of shift. Therefore, a fast followability for the hand shake correction and an accurate positioning for the pixel shift can be made compatible.

Moreover, in the digital camera of the first aspect of the present invention, the amount of shift is expressed by the total amount of the horizontal shift amount "dh" in the horizontal direction and the shift amount "dv" in the vertical direction, and assuming that a horizontal pixel pitch is "ph", a vertical pixel pitch is "pv", a horizontal interpolation multiple is "k" and a vertical interpolation multiple is "l" with respect to the image capturing element and integers "m" and "n" are used, then the equations: $dh=ph \times (m+1/k)$; and $dv=pv \times (n+1/l)$ may hold.

According to the construction, the positioning accuracy can be improved by securing an amount of movement greater than the pixel pitch even when it is mechanically difficult to carry out accurate positioning by a movement of an amount smaller than the pixel pitch.

Moreover, the digital camera of the first aspect of the present invention may include a movement amount detection section for detecting the actual amount of movement of the optical member or the image capturing element by means of the hand shake correction mechanism, and the pixel shift may correct the shifted image by the actual amount of movement detected by the movement amount detection section.

According to the construction, even if the actual amount of movement does not completely coincide with the prescribed amount of shift, appropriate interpolations can be carried out by correcting the shifted image.

In a second aspect of the present invention, there is provided an electronically zoomable digital camera having a hand shake correction mechanism for moving an optical member or an image capturing element to correct hand shake, wherein, when electronic zoom operates, pixel shift is carried out in such manner of capturing a reference image that serves as a reference and then capturing a shifted image after moving the optical member or the image capturing element from the reference image by a prescribed amount of shift by means of the hand shake correction mechanism and thereafter interpolating pixels of the shifted image between pixels of the reference image, and the hand shake correction mechanism includes a movement amount regulation section for effecting mechanical regulation so that the amount of movement of the optical member or the image capturing element does not exceed the amount of shift when the pixel shift is carried out.

According to the construction, the pixel shift is carried out during the electronic zoom in the digital camera, and therefore, a high-resolution image can be obtained. Moreover, the hand shake correction and the pixel shift are carried out by the identical hand shake correction mechanism, and therefore, an inexpensive compact digital camera can be provided.

Moreover, by applying a great movement torque that exceeds the movement torque necessary for the movement by the prescribed amount of shift to the image capturing element while effecting regulation so that the image capturing element cannot be moved larger than the prescribed amount of shift by the movement amount regulation section when the pixel shift is carried out, the image capturing element can be accurately moved by the amount of movement regulated by the movement amount regulation section, i.e., by the prescribed amount of shift.

In the digital camera of the second aspect of the present invention, the movement amount regulation section may have a mechanism by which it is advanced and retreated.

Moreover, in the digital camera of the second aspect of the present invention, the pixel shift may be carried out by using the movement amount regulation section in the case of a prescribed electronic zoom magnification.

As described above, according to the present invention, a digital camera capable of obtaining a high-resolution image interpolated by an appropriate pixel shift during the electronic zoom can be provided.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
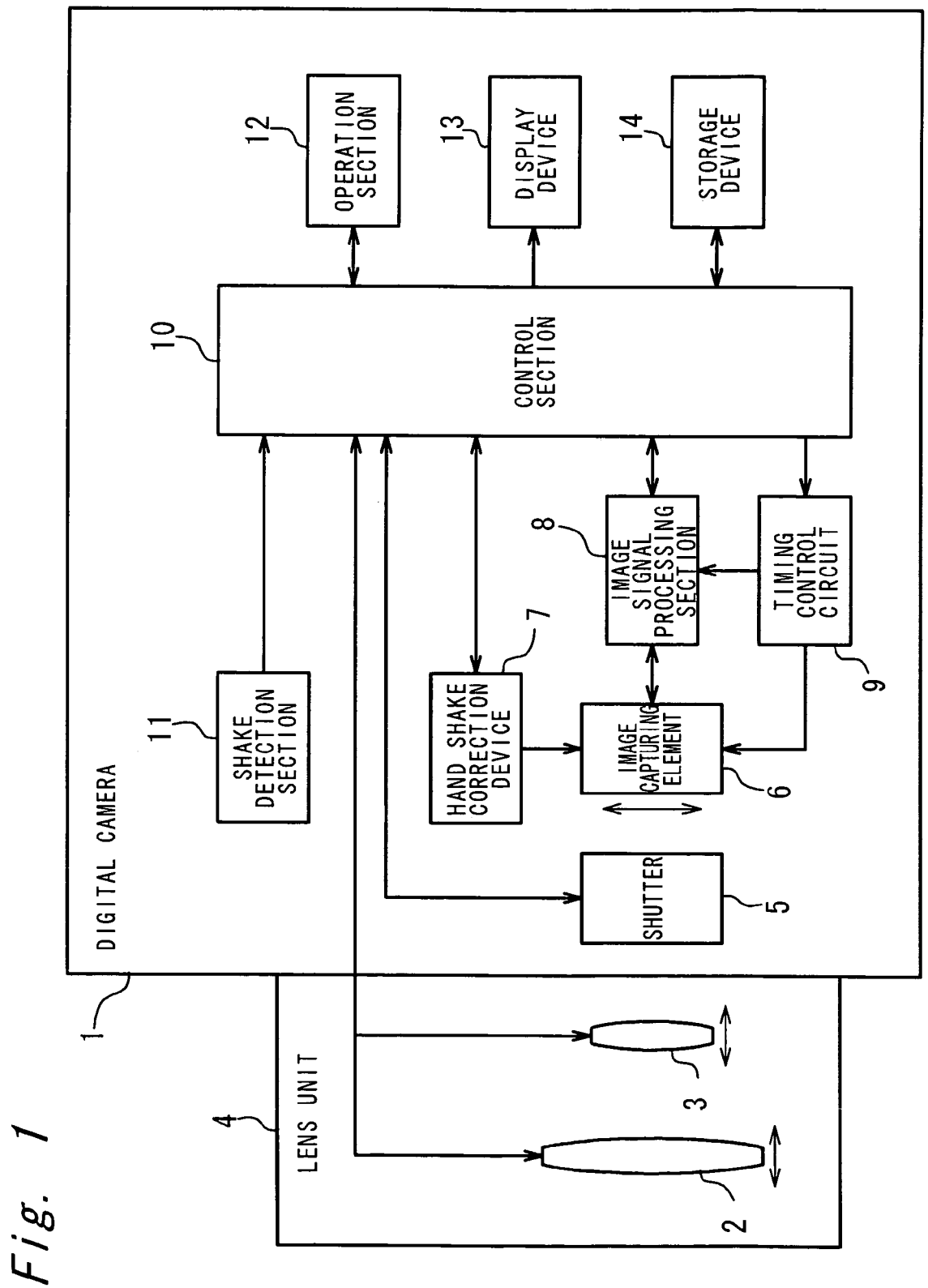
FIG. 1 is a block diagram of a digital camera according to one embodiment of the present invention.

FIG. 1 shows the construction of a digital camera 1 of one embodiment of the present invention. The digital camera 1 includes a lens unit 4 that is composed of movable first lens group 2 and second lens group 3 and is optically zoomable, a shutter 5 and an image capturing element 6 constructed of, for example, a CCD, a hand shake correction device 7 that is the hand shake correction mechanism for moving the image capturing element 6, an image signal processing section 8 for generating image data by processing an image signal obtained by converting light received by the image capturing element 6 into an electrical signal, a timing control circuit 9 for controlling the operation timing of the image capturing element 6 and the image signal processing section 8 and a control section 10 for controlling the image signal processing section 8 and the timing control circuit 9. The digital camera 1 further includes a shake detection section 11 for detecting the amount of shake of the digital camera 1, an operation section 12 by which the user gives instructions to a control section 10, a display device 13 for reproducing an image from the image data generated by the image signal processing section 8 and displaying the image and a storage device 14 for recording the image data generated by the image signal processing section 8.

Figure 2:
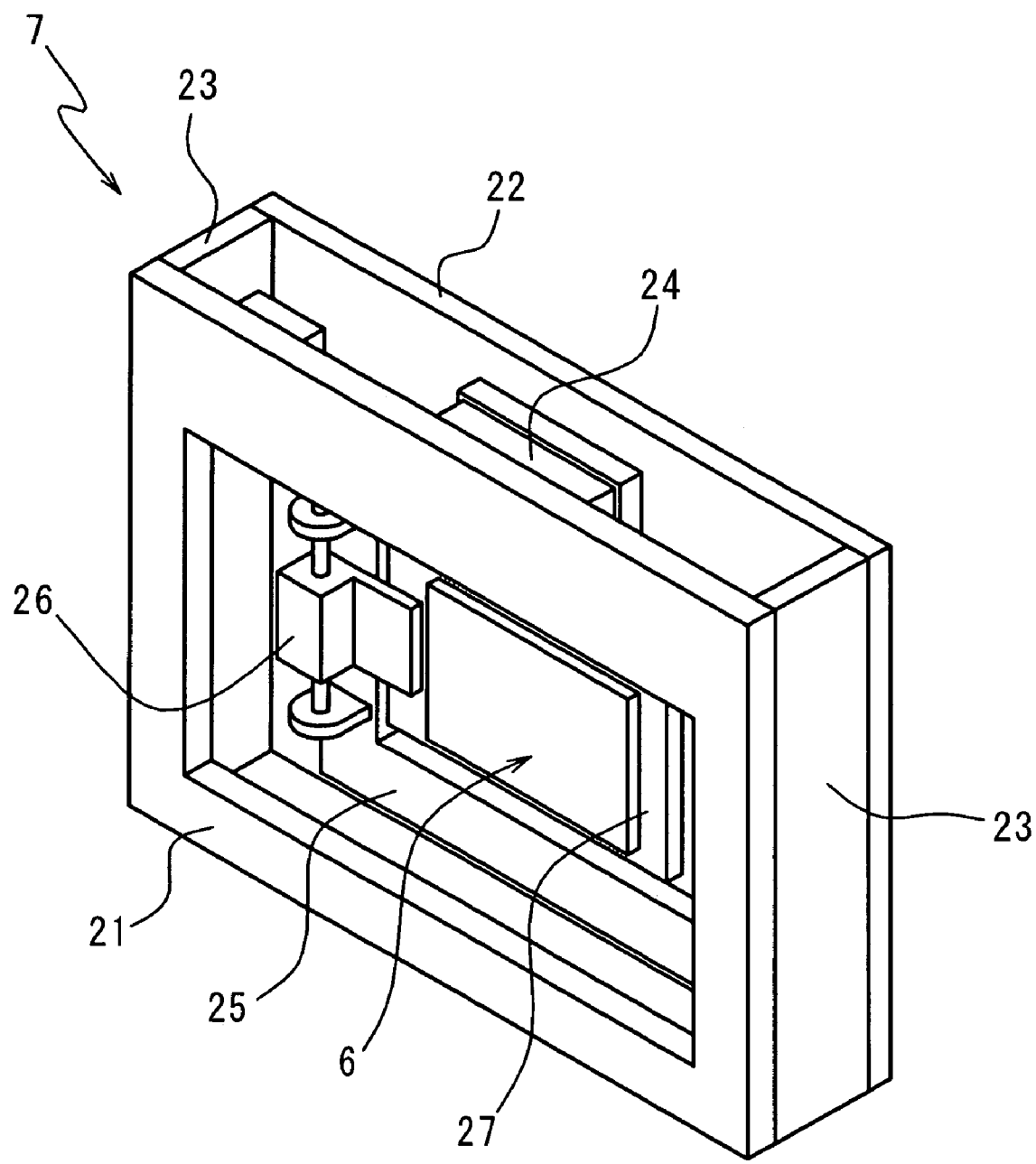
FIG. 2 is a perspective view of a hand shake correction device of FIG. 1.

FIG. 2 shows the hand shake correction device 7. The hand shake correction device 7 has a box-like shape constructed of a front board 21 whose center facing the lens unit 4 is opened, a rear board 22 arranged parallel to the front board 21 and two spacers 23 that constitute the end surfaces of the side portions and define an interval between the front board 21 and the rear board 22. An X-baseplate 25, which is transversely movably supported by an X-actuator 24 and whose center is opened, is provided for the front board 21 inside the hand shake correction device 7. Further, a Y-baseplate 27, which is vertically movably supported by a Y-actuator 26 and holds the image capturing element 6, is provided for the X-baseplate 25 inside the hand shake correction device 7.

Figure 3:
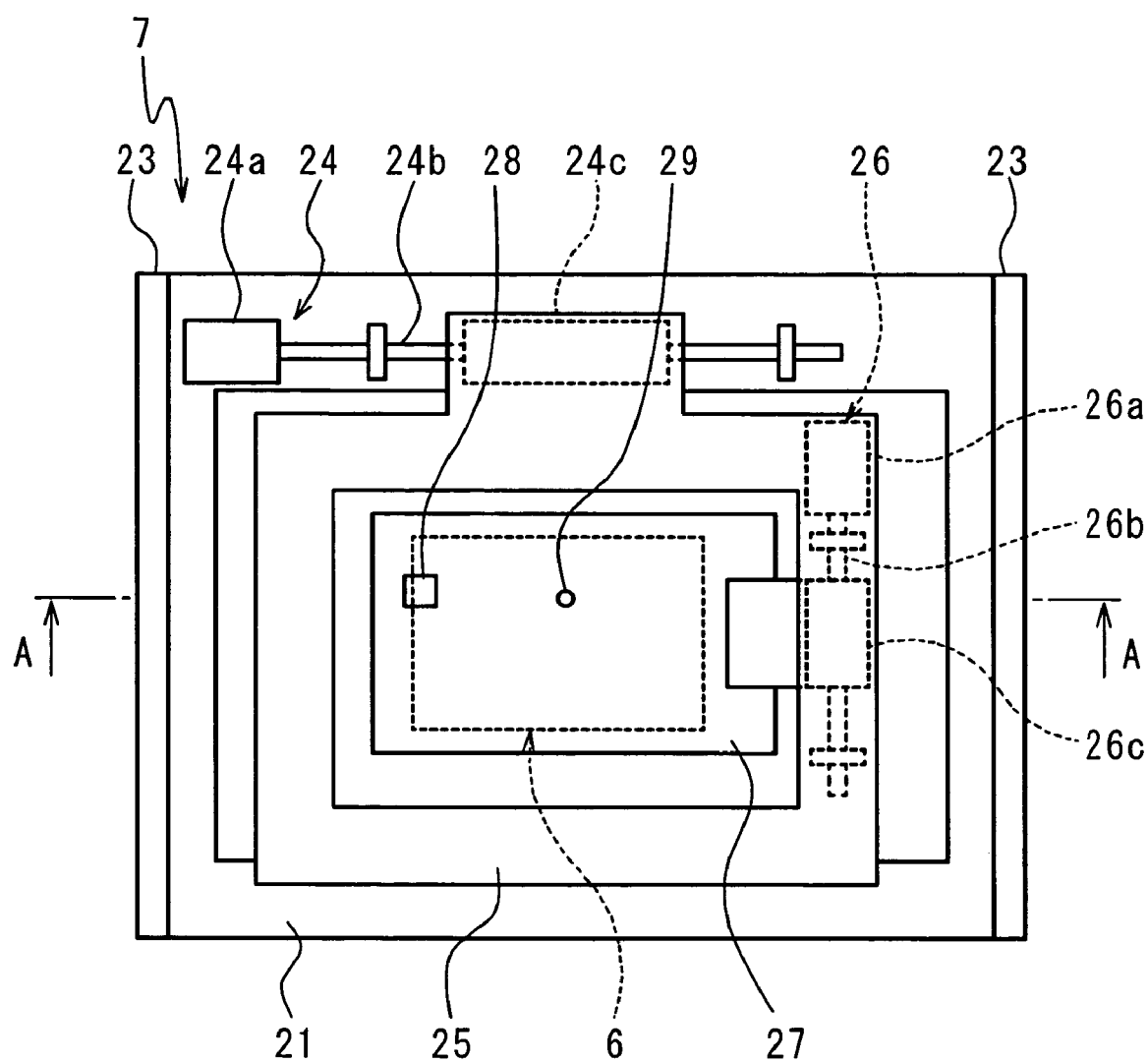
FIG. 3 is a rear view of the hand shake correction device of FIG. 2.

FIG. 3 shows the rear side of the hand shake correction device 7 from which the rear board 22 is removed. The X-actuator 24 is a piezoelectric actuator constituted of a drive section 24a constructed of a piezoelectric element that transversely expands and contracts upon receiving a voltage applied thereto, a friction member 24b that is moved in the lengthwise direction by the expansion and contraction of the drive section 24a and a movement section 24c that is frictionally engaged with the friction member 24b. The Y-actuator 26 is also a piezoelectric actuator similarly constituted of a drive section 26a, a friction member 26b and a movement section 26c. A Hall element 28 and a columnar regulation projection 29 are provided on the rear surface of the Y-baseplate 27.

Figure 4:
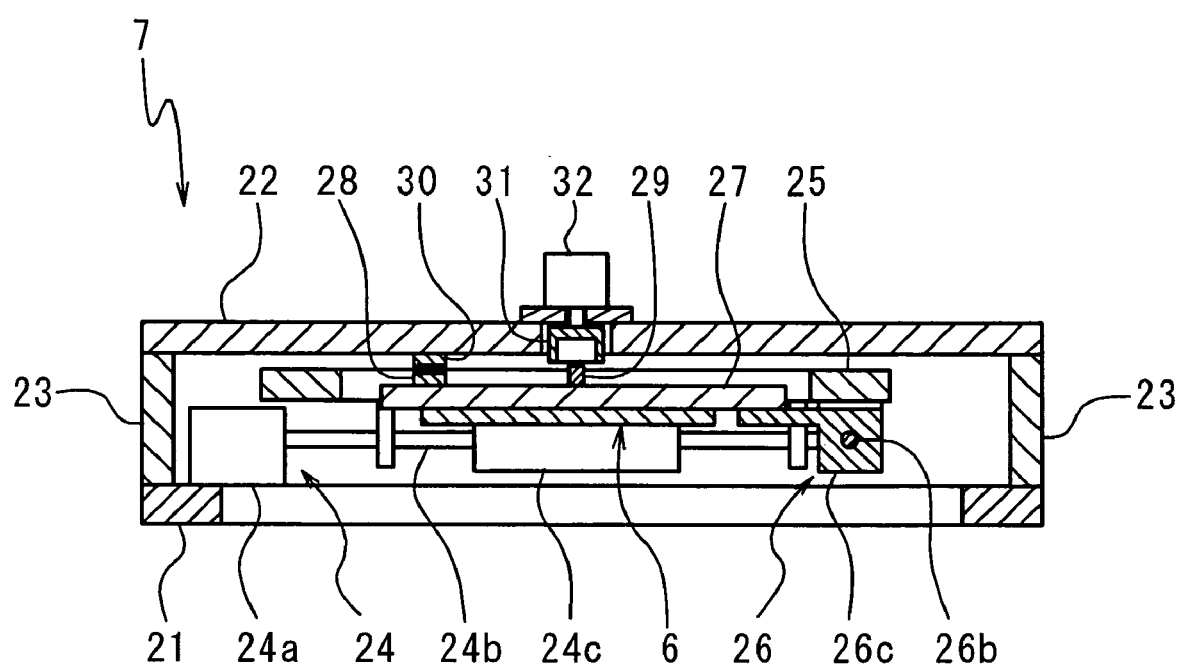
FIG. 4 is a sectional view of the hand shake correction device of FIG. 2.

Further, FIG. 4 shows the cross-section taken along the line A-A of FIG. 3 of the hand shake correction device 7. A magnet 30 facing the Hall element 28 on the Y-baseplate 27 is provided for the rear board 22, constituting a movement amount detection section for detecting the amount of movement of the Y-baseplate 27 with respect to the rear board 22 by the Hall element 28. Moreover, in the rear board 22, a regulation frame 31 is provided in a position facing the regulation projection 29 on the Y-baseplate 27 when the X-actuator 24 and the Y-actuator 26 are located at the origin (i.e., center of the movable range). The regulation frame 31, which is positioned behind the rear end of the regulation projection 29 in FIG. 4, is able to advance against the Y-baseplate 27 so as to surround the periphery of the regulation projection 29 by a frame actuator 32 and retreat away from the Y-baseplate 27 as shown in FIG. 4. The regulation projection 29 and the regulation frame 31 constitutes a movement amount regulation section.

Operation of the digital camera 1 constructed as above will be described next.

The digital camera 1 inputs an image signal obtained by converting with the image capturing element 6 an image, which is formed on the image capturing element 6, into an electrical signal to the image signal processing section 8 and makes the image signal processing section 8 generate image data by controlling the image signal processing section 8 and the timing control circuit 9 by the control section 10 according to the instructions that the user gives by means of the operation section 12. When the hand shake correction is carried out in the digital camera 1, the shake detection section 11 detects the amount of shake of the digital camera 1 and inputs the same to the control section 10. Then, the control section 10 moves the image capturing element 6 by means of the hand shake correction device 7 so as to cancel the amount of shake inputted from the shake detection section 11, thereby allowing the hand shake correction to be carried out. Moreover, the digital camera 1 is optically zoomable so as to enlarge the image formed on the image capturing element 6 by moving the first lens group 2 and the second lens group 3. If the enlargement ratio by the optical zoom is the maximum, it is possible to carry out electronic zoom for obtaining an image of a small apparent angle of view by further cutting out only a part of the image formed on the image capturing element 6 in the image signal processing section 8. Moreover, when the hand shake correction is not used, the digital camera 1 is able to carry out the pixel shift for interpolating the pixels so as to compensate for a degradation in resolution by capturing a shifted image by moving the image capturing element 6 by a prescribed amount of shift by the hand shake correction device 7 when the electronic zoom is carried out.

Figure 5:
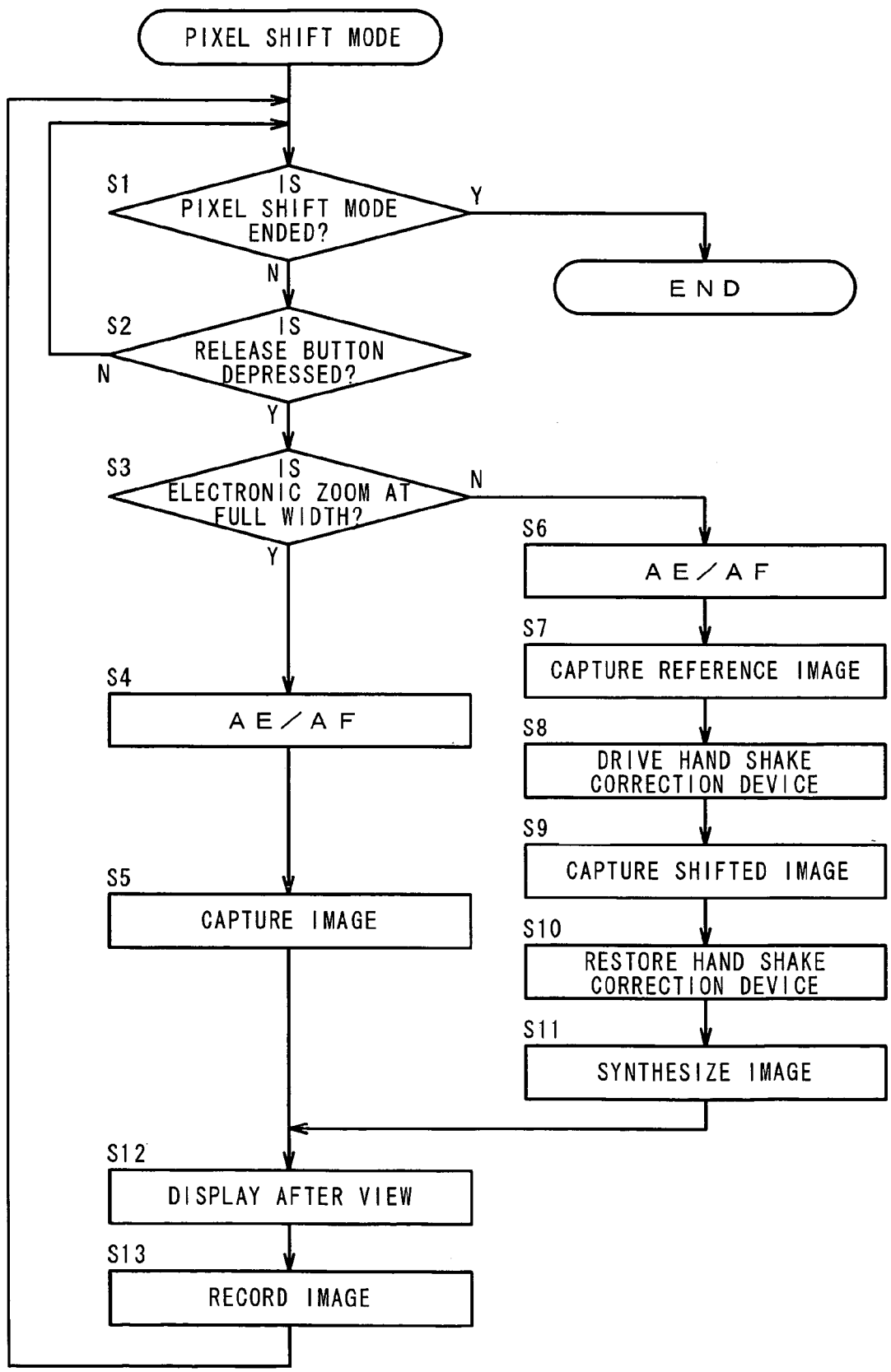
FIG. 5 is a flowchart of capturing an image in a pixel shift mode of the digital camera of FIG. 1.

FIG. 5 shows the flow of the operation when the digital camera 1 is set in a pixel shift mode in which pixel shift is carried out. In the pixel shift mode, the digital camera 1 first confirms in step S1 whether or not the pixel shift mode is still set and confirms in step S2 whether or not a release button of one operating member of the operation section 12 is depressed. If the pixel shift mode has been ended in step 1, then the processing is ended, and image capturing operation in step S3 and the subsequent steps are carried out upon detecting that the release button is depressed in step S2. The confirmations in step S1 and step S2 will be repeated until the release button is depressed. If it is detected that the release button is depressed in step S2, then the state of the electronic zoom is confirmed in step S3. If the electronic zoom is at the full width, i.e., if the enlargement ratio by the electronic zoom is one (×1), then the normal image capturing operation of carrying out automatic exposure compensation and automatic focus adjustment in step S4 and generating pickup image data by processing the signal generated by the image capturing element 6 in the image signal processing section 8 in step S5 is carried out. If the electronic zoom is not at the full width, i.e., if the enlargement ratio by the electronic zoom is greater than one, then image capturing operation for carrying out the interpolation of the pixels by the pixel shift in steps S6 through S11 is carried out. The image capturing operation for carrying out the interpolation by the pixel shift is carried out by first effecting the automatic exposure compensation and the automatic focus adjustment in step S6 and then carrying out a capture of a reference image for generating image data by processing the signal generated by the image capturing element 6 in the image signal processing section 8 in step S7. Subsequently, by first shifting the image capturing element 6 by a prescribed amount of shift by driving the X-actuator 24 and the Y-actuator 26 of the hand shake correction device 7 in step S8 and then capturing the shifted image for generating image data by processing the signal generated by the image capturing element 6 in the image signal processing section 8 in step S9 similarly to step 7. Then, the X-actuator 24 and the Y-actuator 26 of the hand shake correction device 7 are restored in step S10 into the states before they are driven in step S8, and image synthesis for generating image data by interpolating the image data of the reference image captured in step S7 with the image data of the shifted image captured in step S9 is carried out in the image signal processing section 8 in step S11. After the normal image capturing operation in steps S4 and S5 or the image capturing operation for carrying out the interpolation by the pixel shift in steps S6 through S11, an after view is displayed on the display device 13 in step S12, and the series of imaging operation is completed by recording the captured image data in the storage device 14 in step S13. Subsequently, the digital camera 1 repeats the confirmations in step S1 and step S2 again, getting ready for an instruction from the user.

Although the image capturing operation for carrying out the interpolation by the pixel shift in steps S6 through S11 is carried out when the electronic zoom is not at the full width in step S3 in the present embodiment, it is acceptable to carry out the normal image capturing operation in steps S4 and S5 when the enlargement ratio by the electronic zoom is smaller than the prescribed enlargement ratio (when the electronic zoom magnification is smaller than, for example, two (×2)) and carry out the image capturing operation in steps S6 through S11 when the enlargement ratio by the electronic zoom is not smaller than the prescribed enlargement ratio (when the electronic zoom magnification is not smaller than, for example, two (×2)).

Figure 6A:
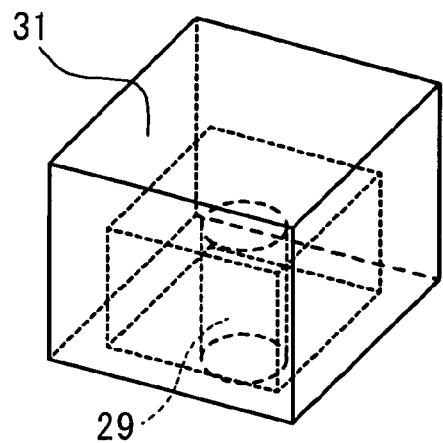
FIGS. 6A through 6C are perspective views showing the relative relation between a regulation projection and a regulation frame of FIG. 4.
Figure 6B:
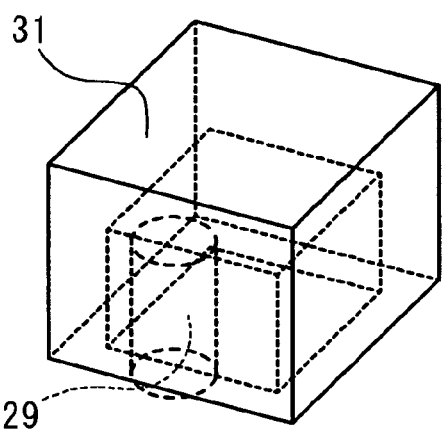
Figure 6C:
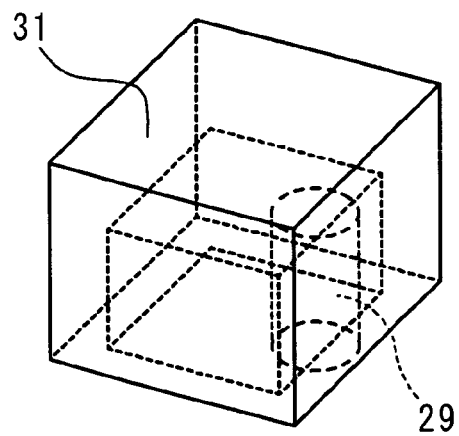

Further, the driving of the image capturing element 6 by the hand shake correction device 7 when the pixel shift is carried out will be described in detail. If the digital camera 1 is set so as to carry out the pixel shift, then the X-actuator 24 and the Y-actuator 26 first support the X-baseplate 25 and the Y-baseplate 27, respectively, at the origins at the centers of respective movable ranges, and the frame actuator 32 makes the regulation frame 31 approach the Y-baseplate 27. Then, as shown in FIG. 6A, the regulation frame 31 enters a state in which the frame 31 surrounds the periphery of the regulation projection 29. Then, if the X-actuator 24 is driven so as to largely move the X-baseplate 25 in a prescribed direction and the Y-actuator 26 is driven to largely move the Y-baseplate 27 in a prescribed direction, then the regulation projection 29 moves until it comes in contact with the regulation frame 31, and the regulation projection 29 enters a state in which the projection 29 is brought in contact with a corner of the regulation frame 31 as shown in FIG. 6B. When the electronic zoom is not used, image capturing is carried out in the state. When the electronic zoom is used, the image data captured in the state is first stored as a reference image in a memory inside the image signal processing section 8. Further, the X-actuator 24 is driven so as to largely move the X-baseplate 25 in the direction reversely to the previous one, and the Y-actuator 26 is driven so as to move the Y-baseplate 27 in the direction reversely to the previous one, moving the regulation projection 29 to a position where the projection 29 comes in contact with the corner on the opposite side of the regulation frame 31 as shown in FIG. 6C. Since the image capturing element 6 moves together with the regulation projection 29, the image captured in the state of FIG. 6C becomes a shifted image of which the image capturing range is shifted by the amount of shift determined by the dimensions of the regulation projection 29 and the regulation frame 31 from the foregoing reference image.

Assuming herein that the image capturing element 6 has a square pixel of a pixel pitch of 1 μm (horizontal pixel pitch "ph"=vertical pixel pitch "pv"=1 μm), the diameter of the regulation projection 29 is 1000 μm and the length of one side of the interior of the regulation frame 31 is 1800.5 μm, then a horizontal shift amount "dh" and a vertical shift amount "dv" both becomes 800.5 μm and hold the equations:

$$dh=ph \times (800+½); \text{ and}$$

$$dv=pv \times (800+½).$$

That is, the horizontal shift amount "dh" is a distance obtained by multiplying the sum total of the integer "m" (=800) and the reciprocal of a horizontal interpolation multiple "k" (=2) by the horizontal pixel pitch "ph", while the vertical shift amount "dv" is a distance obtained by multiplying the sum total of the integer "n" (=800) and the reciprocal of a vertical interpolation multiple "l" (=2) by the vertical pixel pitch "pv" (1 μm).

The X-actuator 24 and the Y-actuator 26 move the movement members 24c and 26c by repeating the engagement by static friction between the friction members 24b and 26b and the movement members 24c and 26c and a slide accompanying a dynamic friction. Therefore, if it is attempted to extremely reduce the amount of movement, then the movement members 24c and 26c cannot obtain a stable sliding friction state with respect to the friction members 24b and 26b, sometimes causing instability of the drive amount. Accordingly, if the amount of shift during the pixel shift is set greater than each of the pixel pitches "ph" and "pv" as in the present embodiment, then the movement members 24c and 26c are once reliably put in a complete sliding friction state, making it possible to achieve a stable movement and highly accurate positioning.

Figure 7:
FIG. 7 is a drive voltage waveform chart of the hand shake correction device of FIG. 1.
Figure 7:

When the hand shake correction is carried out in the digital camera 1, the X-actuator 24 and the Y-actuator 26 are driven in a continuous mode in which a square wave voltage of a short cycle is repetitively inputted to the drive sections 24a and 26a according to the intended amount of shift of the image capturing element 6 as shown in the upper row of FIG. 7. If a voltage of the waveform described above is inputted, then the movement members 24c and 26c are to repeat the frictional engagement state and the sliding friction state every cycle with respect to the friction members 24b and 26b. If the pixel shift is carried out in the continuous mode, it is concerned that the positioning accuracy might be degraded as a consequence of an excessive reduction in the amount of movement from the frictional engagement state immediately before the contact of the regulation projection 29 with the regulation frame 31 as described hereinbefore. Accordingly, the digital camera 1 has a fixed amount mode in which the X-actuator 24 and the Y-actuator 26 are driven by a triangular wave voltage of a long cycle when the pixel shift is carried out as shown in the lower row of FIG. 7. According to this waveform, a slide more than the necessary amount of movement for the pixel shift is generated to bring the regulation projection 29 in contact with the regulation frame 31 merely by sliding once the movement members 24c and 26c with respect to the friction members 24b and 26b, and therefore, a prescribed amount of shift can be accurately generated.

Figure 8:
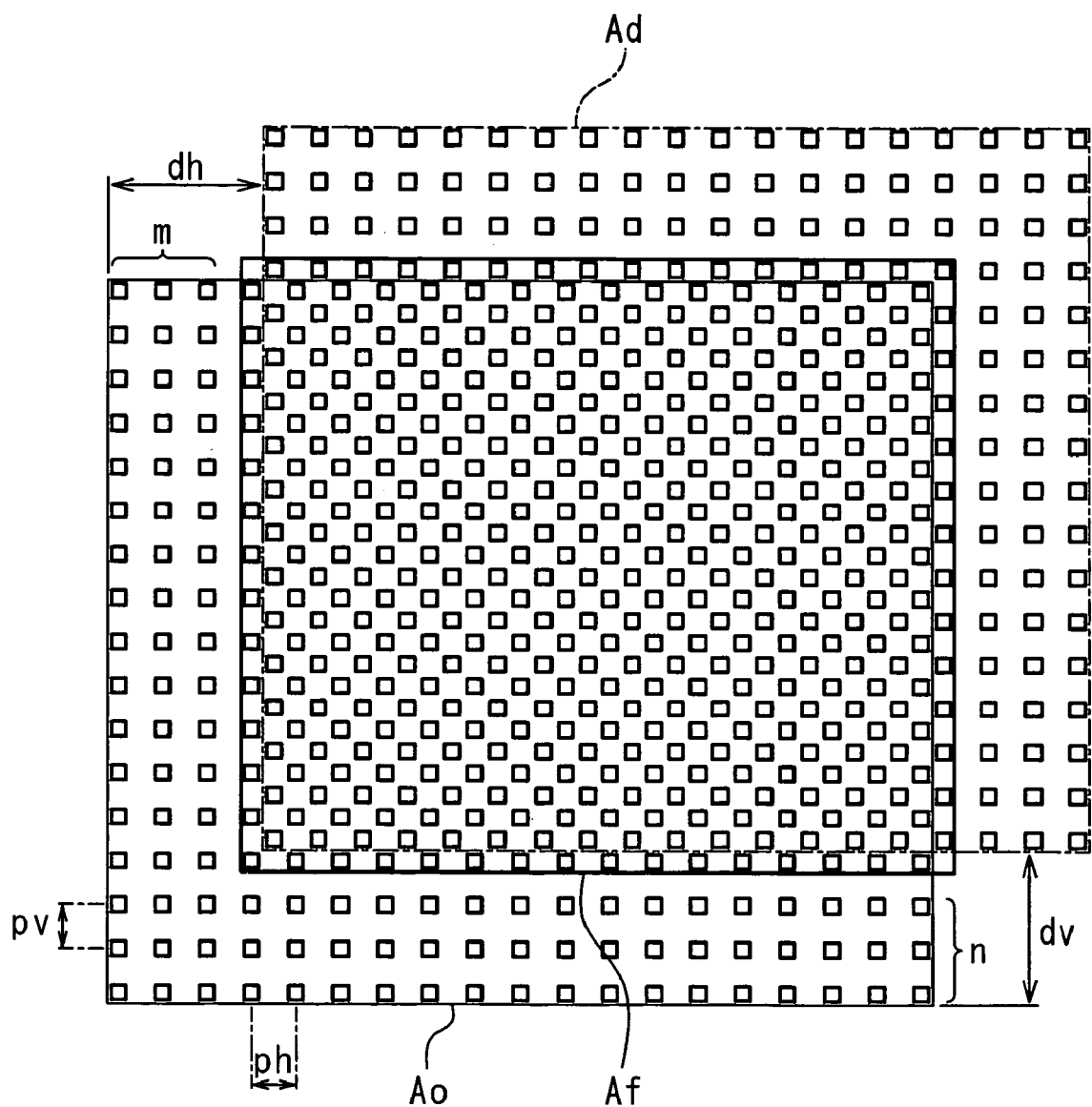
FIG. 8 is a schematic view showing the relation between a reference image and a shifted image of the digital camera of FIG. 1.

FIG. 8 shows the relation between the reference image Ao and the shifted image Ad at this time in a simplified form. As illustrated, a synthetic image Af that has a pixel density two times that of the reference image Ao (interpolation multiple "k"="l"=2) is obtained by interpolating the reference image Ao with the shifted image Ad. As illustrated, the pixels of m columns at one end in the horizontal direction and the pixels of n rows at one end in the vertical direction of the reference image cannot be used for the synthetic image Af. Therefore, an image cutting range by the electronic zoom is required to be within the range of the synthetic image Af. When the pixel shift is carried out, the image signal processing section 8 temporarily stores the image data of the reference image Ao into the internal memory and transmits the image data of the effective image Af obtained by interpolation with the image data of the shifted image Ad to the control section 10. However, if only the image data within the range to be finally cut out of the reference image Ao by the electronic zoom is stored into the memory and the image data stored in the memory is similarly interpolated by using only the image data within the range to be cut out of the shifted images Ad, then the load of the interpolation processing becomes reduced, making it possible to achieve processing in a short time and power saving.

Moreover, the horizontal pixel pitch "ph" and the vertical pixel pitch "pv" may have mutually different pitches, the horizontal interpolation multiple "k" and the vertical interpolation multiple "l" may have mutually different values, and the integers "m" and "n" may have mutually different values. In such case, the following two equations:

$$dh=ph \times (m+1/k); \text{ and}$$

$$dv=pv \times (n+1/l)$$

are also required to be satisfied.

Figure 9:
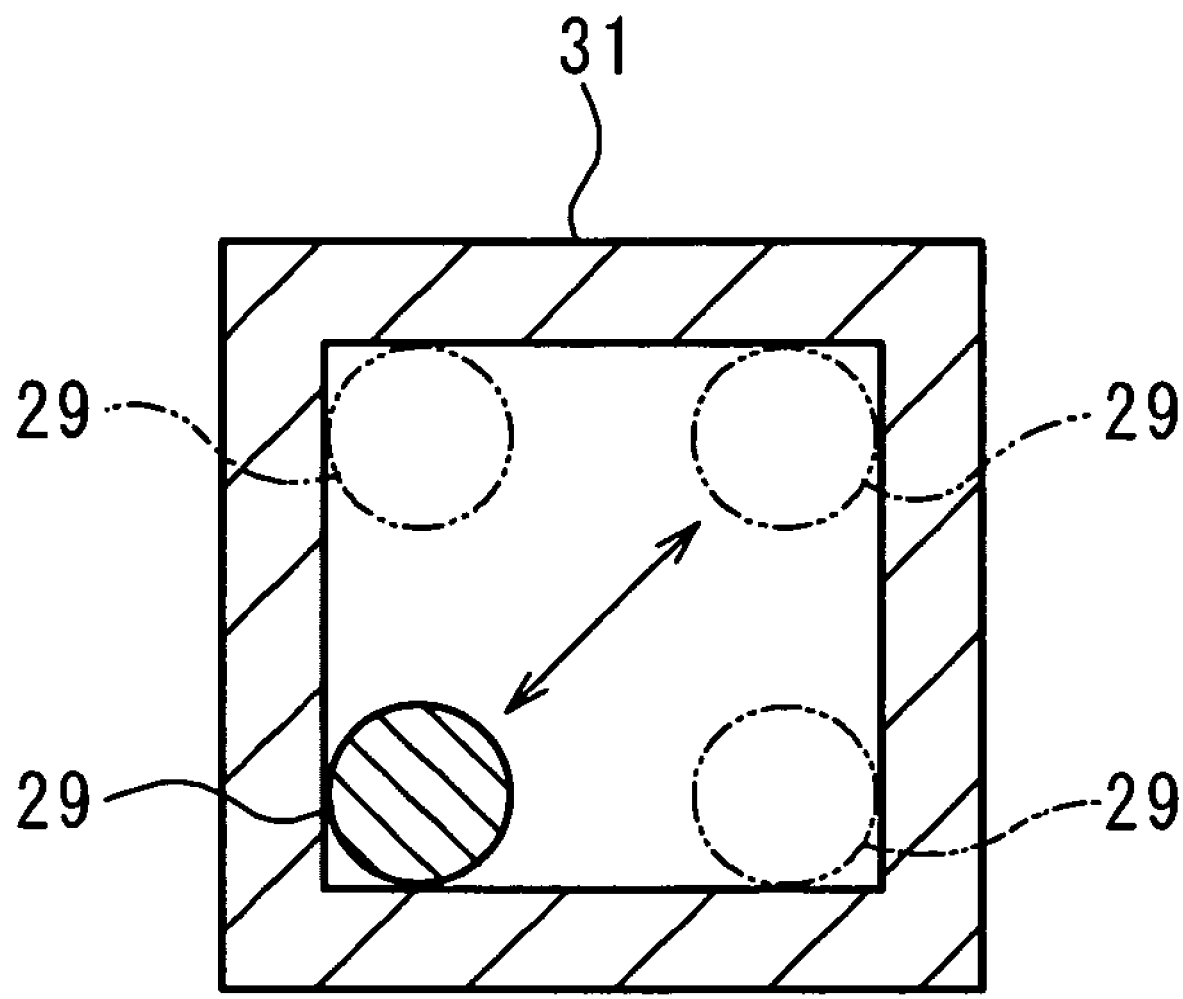
FIG. 9 is a sectional view showing the relative relation between a regulation projection and a regulation frame of FIG. 4.
Figure 10A:
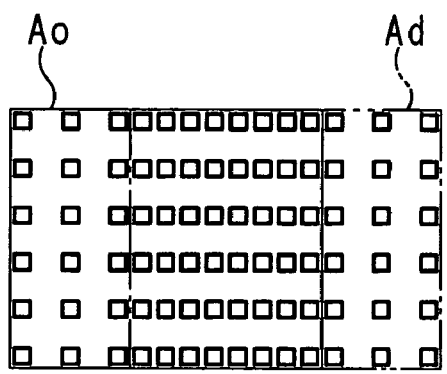
FIGS. 10A through 10D are schematic views showing the relation between a plurality of shifted images different from the shifted image of FIG. 8 and the reference image.
Figure 10B:
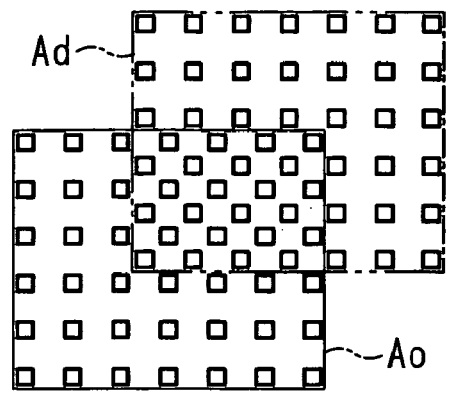
Figure 10C:
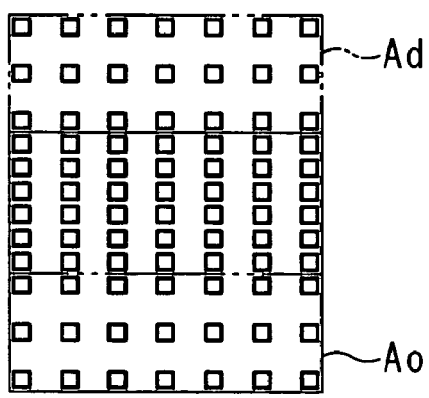
Figure 10D:
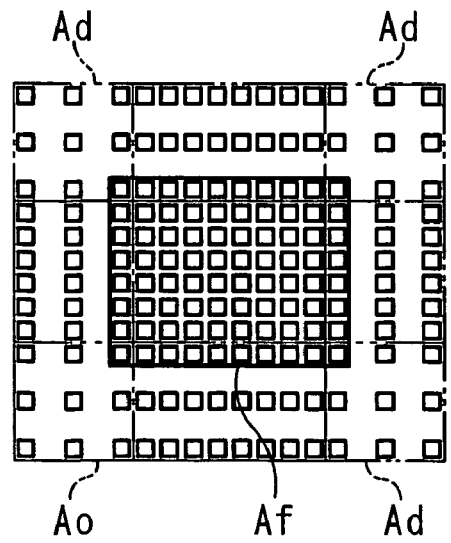

FIG. 9 shows the relation between the regulation projection 29 and the regulation frame 31, and the shifted image for obtaining the pixel density two times that of the reference image Ao can be obtained by moving the regulation projection 29 on the diagonal line of the regulation frame 31 as described hereinbefore. However, if the X-actuator 24 and the Y-actuator 26 are successively operated to move the regulation projection 29 along the four sides of the regulation frame 31 and bring the projection 29 in contact with the four corners of the regulation frame 31, three shifted images Ad as shown in FIGS. 10A, 10B and 10C can be obtained. Then, as shown in FIG. 10D, the effective image Af, which has a pixel density four times that of the reference image Ao, can be obtained by interpolating the reference image Ao with the three shifted images Ad. At this time, each of the horizontal interpolation multiple "k" and the vertical interpolation multiple "l" still remains two times when viewed in the respective directions, whereas the absolute amount of shift becomes reduced to "dh" or "dv" from "$(dh^2+dv^2)^{1/2}=2^{1/2} \cdot dh=2^{1/2} \cdot dv$". If these are combined to move the regulation projection 29 on the diagonal line of the regulation frame 31 when the enlargement ratio by the electronic zoom is small and move the regulation projection 29 along the four sides of the regulation frame 31 to bring the projection 29 sequentially in contact with the four corners of the regulation frame 31 when the enlargement ratio by the electronic zoom is great, then the number of interpolation pixels can be increased so as to compensate for the resolution that reduces as the enlargement ratio of the electronic zoom increases.

Figure 11:
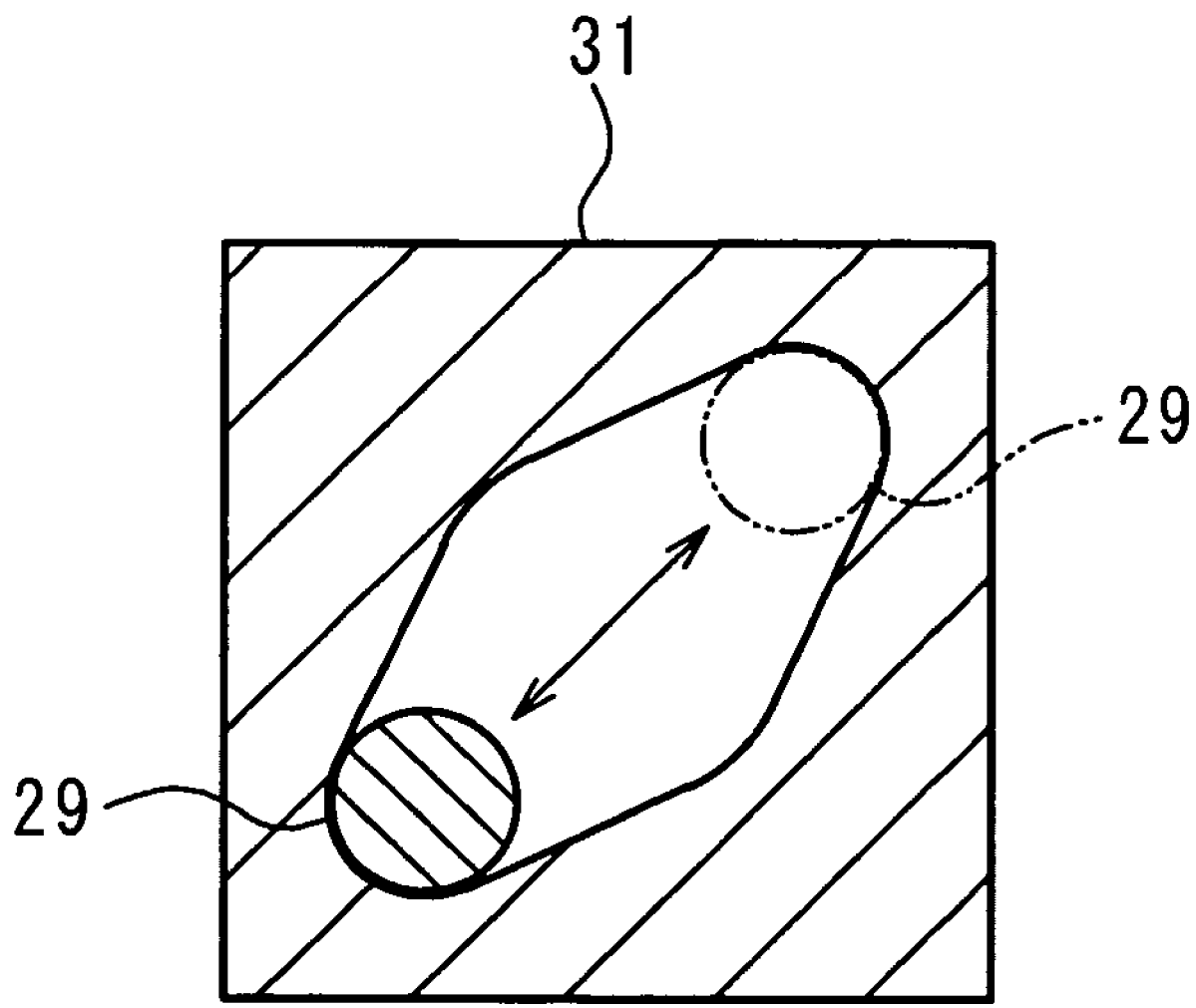
FIG. 11 is a sectional view showing an alternative plan of the regulation frame of FIG. 9.

If the regulation projection 29 is moved only on the diagonal line of the regulation frame 31 without changing the amount of shift as described above, it is acceptable to provide a configuration as shown in FIG. 11 in which two corners of the regulation frame 31 are connected by curved lines. If the regulation frame 31 is formed into such a configuration, a force takes effect so as to move the regulation projection 29 to the other direction by a driving torque in either one direction even if the driving torque of either one of the X-actuator 24 and the Y-actuator 26 is not sufficient, and therefore, the regulation projection 29 can be more reliably moved by a prescribed amount.

Moreover, it is acceptable to detect the actual amount of shift of the image capturing element 6 by means of the Hall element 28, correct the pixels of the shifted image according to the actual amount of movement, calculate the weighted mean to the surrounding pixels to obtain the shifted image and thereafter use the shifted image for the interpolation of the reference image in the digital camera 1.

Moreover, if the digital camera 1 suffers a hand shake at a speed higher than a specified speed, then the actual amount of shift of the shifted image largely differs from the amount of shift of the image capturing element 6 by the hand shake correction device 7. If the reference image is corrected by such a shifted image, then the image becomes rather indistinct. Therefore, when the shake detection section 11 detects a speed higher than a prescribed speed, it is proper to carry out no pixel shift with an error indication displayed on the display device even when the digital camera 1 is set so as to carry out the pixel shift.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electronically zoomable digital camera having a hand shake correction mechanism for moving an optical member or an image capturing element to correct hand shake, wherein, when electronic zoom operates, pixel shift is carried out in such manner of capturing a reference image that serves as a reference and then capturing a shifted image after moving the optical member or the image capturing element from the reference image by a prescribed amount of shift by means of the hand shake correction mechanism and thereafter interpolating pixels of the shifted image between pixels of the reference image, the amount of shift is changed according to a magnification of the electronic zoom, and the hand shake correction mechanism has a continuous mode in which the movement is effected by a continuous amount and a fixed amount mode in which movement is effected by only a fixed amount and is driven in the fixed amount mode when the pixel shift is carried out.

2. The digital camera as claimed in claim 1, wherein the hand shake correction mechanism is driven by a piezoelectric element, a square wave voltage is applied to the piezoelectric element in the continuous mode, and a triangular wave voltage of a wavelength longer than that of the square wave voltage is applied to the piezoelectric element only once per movement in the fixed amount mode.

3. The digital camera as claimed in claim 1, wherein the amount of shift is expressed by a total amount of a horizontal shift amount "dh" in a horizontal direction and a shift amount "dv" in a vertical direction, and assuming that a horizontal pixel pitch is "ph", a vertical pixel pitch is "pv", a horizontal interpolation multiple is "k" and a vertical interpolation multiple is "1" with respect to the image capturing element and integers "m" and "n" are used, then the equations:

$dh=ph \times (m+1/k)$; and $dv=pv \times (n+1/l)$ hold.

4. The digital camera as claimed in claim 1, wherein the digital camera comprises a movement amount detection section for detecting an actual amount of movement of the optical member or the image capturing element by the hand shake correction mechanism, and the pixel shift corrects the shifted image by the actual amount of movement detected by the movement amount detection section.

5. An electronically zoomable digital camera having a hand shake correction mechanism for moving an optical member or an image capturing element to correct hand shake, wherein, when electronic zoom operates, pixel shift is carried out in such manner of capturing a reference image that serves as a reference and then capturing a shifted image after moving the optical member or the image capturing element from the reference image by a prescribed amount of shift by means of the hand shake correction mechanism and thereafter interpolating pixels of the shifted image between pixels of the reference image, and the hand shake correction mechanism comprises a movement amount regulation section for effecting mechanical regulation so that the amount of movement of the optical member or the image capturing element does not exceed the amount of shift when the pixel shift is carried out, wherein the movement amount regulation section is composed of a projection and a frame that surrounds the projection.

6. The digital camera as claimed in claim 5, wherein the movement amount regulation section has a mechanism by which it is advanced and retreated.

7. An electronically zoomable digital camera having a hand shake correction mechanism for moving an optical member or an image capturing element to correct hand shake, wherein, when electronic zoom operates, pixel shift is carried out in such manner of capturing a reference image that serves as a reference and then capturing a shifted image after moving the optical member or the image capturing element from the reference image by a prescribed amount of shift by means of the hand shake correction mechanism and thereafter interpolating pixels of the shifted image between pixels of the reference image, and the hand shake correction mechanism comprises a movement amount regulation section for effecting mechanical regulation so that the amount of movement of the optical member or the image capturing element does not exceed the amount of shift when the pixel shift is carried out, wherein the pixel shift is carried out by using the movement amount regulation section in accordance with an amount of a prescribed electronic zoom magnification.

* * * * *